INVENTOR
JAMES S. HARDIGG

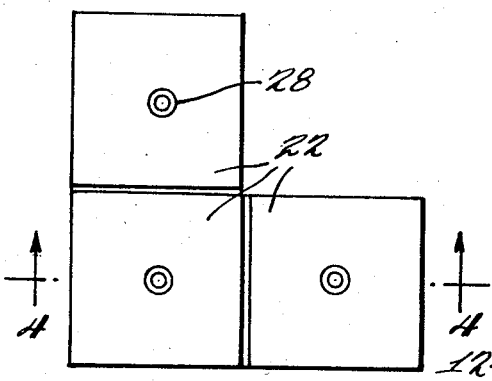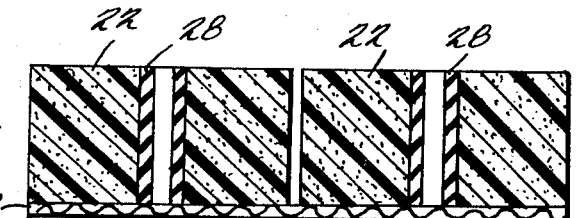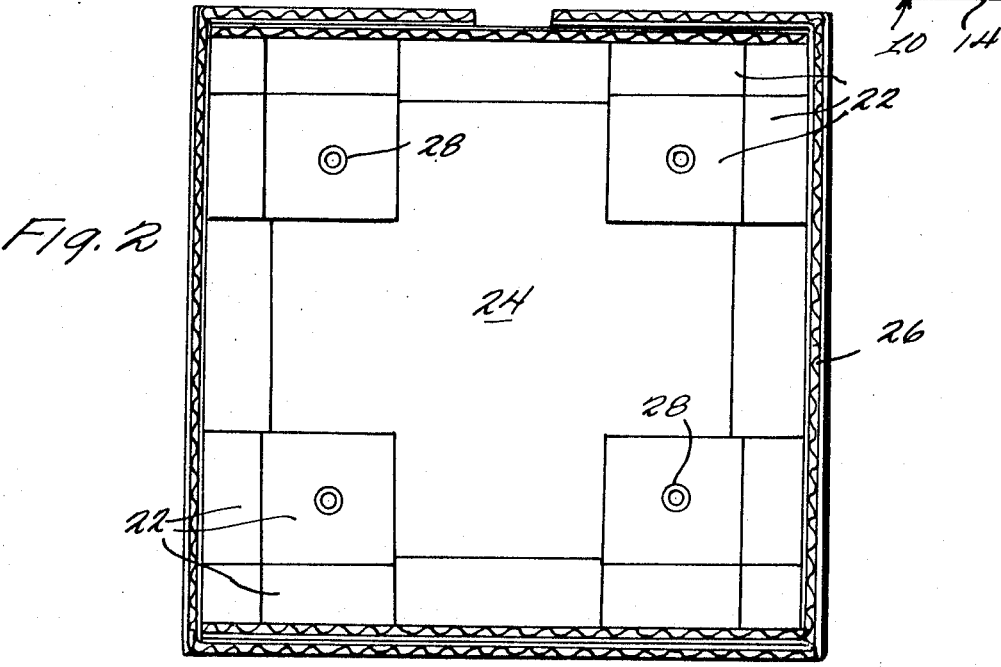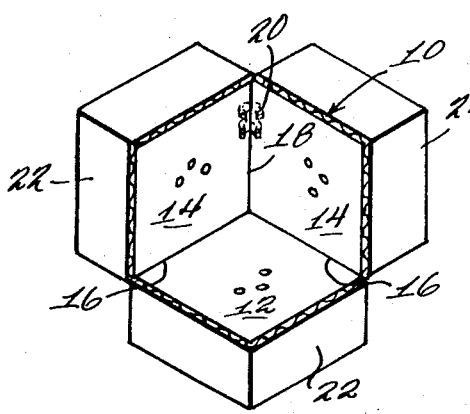

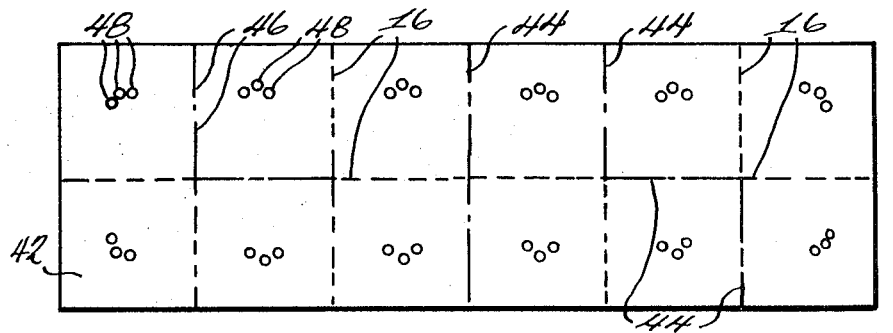
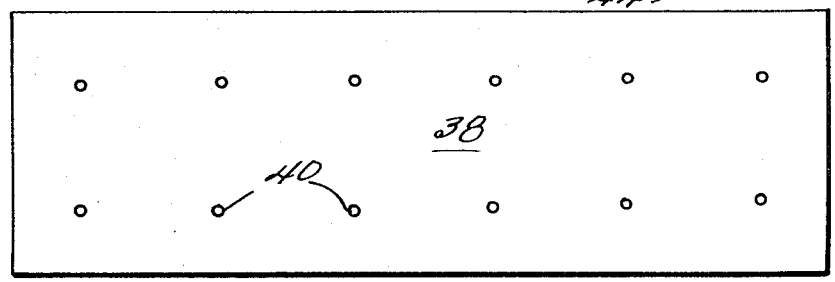
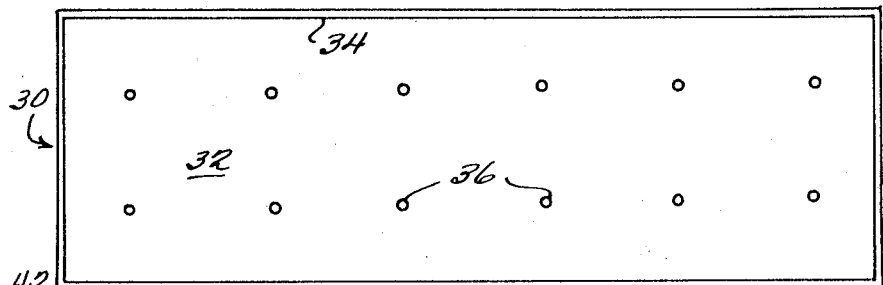
Fig. 5
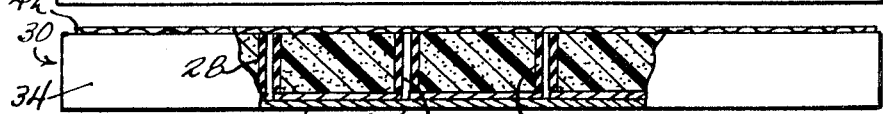
Fig. 6
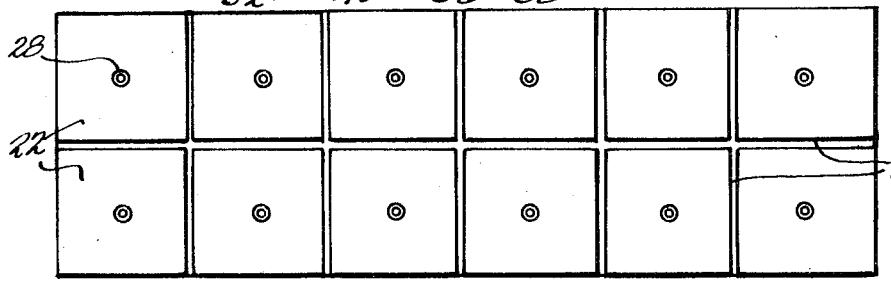
Fig. 7
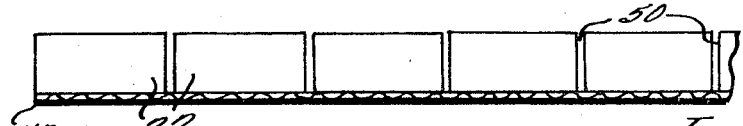
Fig. 8
INVENTOR
JAMES S. HARDIGG
BY Cushman, Darby & Cushman
ATTORNEYS

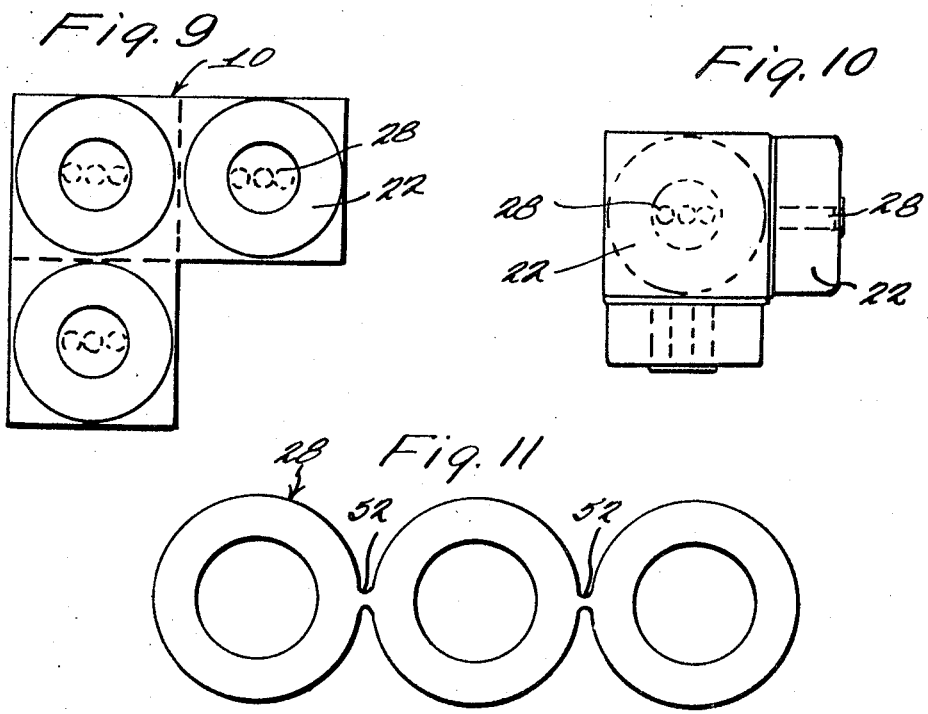
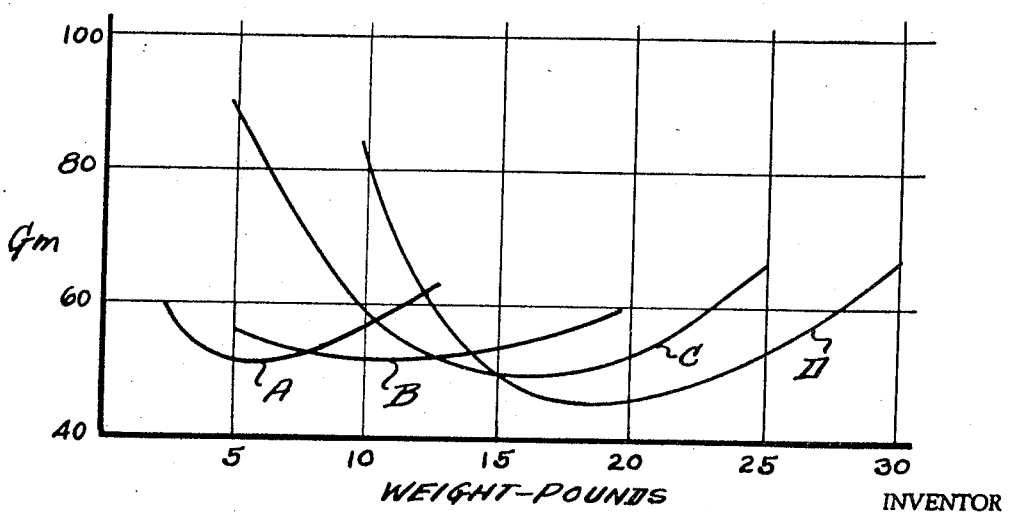

BY Cushman, Darby & Cushman

ATTORNEYS

INVENTOR
JAMES S. HARDIGG

United States Patent Office 3,445,553
Patented May 20, 1969

3,445,553
METHOD OF MAKING A SHOCK ISOLATOR ELEMENT FOR CUSHIONED CONTAINER UNIT
James S. Hardigg, P.O. Box 89, Conway, Mass. 01341
Original application Apr. 2, 1965, Ser. No. 445,164, now Patent No. 3,283,988, dated Nov. 8, 1966. Divided and this application Mar. 7, 1966, Ser. No. 566,180
Int. Cl. B29h 7/20
U.S. Cl. 264—45          6 Claims

ABSTRACT OF THE DISCLOSURE

A method of making a shock isolator element which includes positioning at least one flexible rod element in a mold so that the rod element extends from the bottom of the mold substantially to the top of the mold, pouring a potentially foamable compressible cellular elastomeric material in said mold whereby the reaction mixture foams in place to substantially surround the rod element, curing the resultant foamed compressible cellular elastomeric material, removing foamed compressible cellular elastomeric material from the mold with the rod element encased therein, the cross-sectional area ratio of said compressible cellular elastomeric material to the rod element being at least about 20:1.

---

This application is a division of my copending application Ser. No. 445,164, filed Apr. 2, 1965 now Patent No. 3,283,988 which is a continuation-in-part of my application Ser. No. 856,807, filed Dec. 2, 1959, now abandoned.

This invention relates to cushioned container units, and to shock isolator elements adapted for incorporation therein. The invention relates also to a novel and efficient method of manufacture of shock isolator elements.

Fragile articles, for example delicate machinery, instruments, electronic components and the like which are subject to damage by shock, severe vibration or similar forces, are customarily and necessarily packaged in cushioned protective containers. Conventional cushioned container units are bulky, heavy and expensive. Many types require custom manufacture, and the container units themselves are expensive to ship and store.

One typical cushioning device is that disclosed in U.S. Patent 2,899,077 to Timms, Aug. 11, 1959. As shown therein a cushion is fabricated from a honeycomb structure of regularly-shaped solid rubber ribs having a relatively high modulus of rigidity and high resistance to compression. The latticework of interconnected ribs surrounds the cellular rubber thus resulting in an unfavorable column length to thickness ratio. Additionally, because the foamed material of the Timms device is surrounded by solid rubber, the ability of expelling trapped air within the cellular or foamed material is substantially diminished causing an unfavorably low thickness efficiency or unfavorably high cushioning factor. This structure while it allegedly resists static loads obviously does not efficiently absorb shock forces or vibration forces to protect and cushion delicate instruments or the like when said forces are exerted in an endwise direction. Further, because of the excess amounts as well as configuration of the solid rubber component of the Timms device, undesirable expenditures are required for its production thus making the resulting product economically unattractive.

It is therefore a principal object to overcome the disadvantages of prior art devices for cushioning articles in transportation and storage.

Another object of the present invention is to provide a novel shock isolator element for cushioned container units, adapted to be shipped and stored in minimum space, and requiring minimum fabrication and assembly by the user.

Still another object is to provide a shock isolator element structure particularly adapted to standardization of sizes and capacities, and which may be utilized to build up cushioned container units with conventional and readily available cartons, such as corrugated fiberboard boxes.

Yet another object of the invention is to provide a shock isolator element exhibiting a unique combination of high shock absorption and static load capacities, adapted to efficiently and effectively protect fragile articles during storage, transportation and drops, which may be either accidental or intentional, as in the case of air drops.

A further object of the invention is to provide economical shock isolator elements of minimum size, particularly advantageous in packaging relatively heavy articles, for example in excess of twenty pounds.

Yet a further object of the present invention is to increase the static load bearing capacity of a polyurethane foam cushioning device while preserving the high thickness efficiency of the foam.

As yet another object, the present invention provides a unique and efficient method for reducing shock isolator elements.

Further objects will be in part evident and in part pointed out hereinafter.

The invention and the novel features therof may best be made clear by reference to the following description and the accompanying drawings, in which:

FIGURE 1 is a perspective view of an exemplary embodiment of the shock isolator element, ready for incorporation into a cushioned container unit;

FIGURE 2 is an elevational view of a complete cushioned container unit, with the front side removed, illustrating the positional and functional relationship of shock isolator elements in accordance with the invention to an outer container and an inner article or container;

FIGURE 3 is a plan view of the element of FIGURE 1 in flat or knocked-down form;

FIGURE 4 is a sectional view taken on the line 4—4 of FIGURE 3;

FIGURE 5 is a plan view of a mold, stripper plate and backing sheet, adapted for simultaneously producing a plurality of shock isolated elements of the form illustrated in FIGURE 3, in accordance with the novel method;

FIGURE 6 is a side elevational view, partly sectioned, illustrating the elements of FIGURE 5 in associated relationship as employed in the method;

FIGURE 7 is a plan view illustrating a molded assembly, ready for separation into individual shock isolator elements of the form illustrated in FIGURE 3;

FIGURE 8 is a side elevational view of the molded assembly of FIGURE 7, looking toward the lower edge thereof;

FIGURE 9 is a plan view of another embodiment of the instant invention illustrating the use of a triple tube;

FIGURE 10 is a sectional view taken on the line 10—10 of FIGURE 9;

FIGURE 11 is an enlarged fragmentary plan view illustrating the triple tube employed in the cushioning device of FIGURE 9;

FIGURE 12 is a graph illustrating the relationship of peak acceleration on impact of an article being cushioned to the weight of the article for various cushioning devices made in accordance with the instant invention;

Figure 16A:
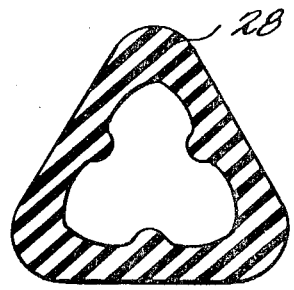
Figure 17:
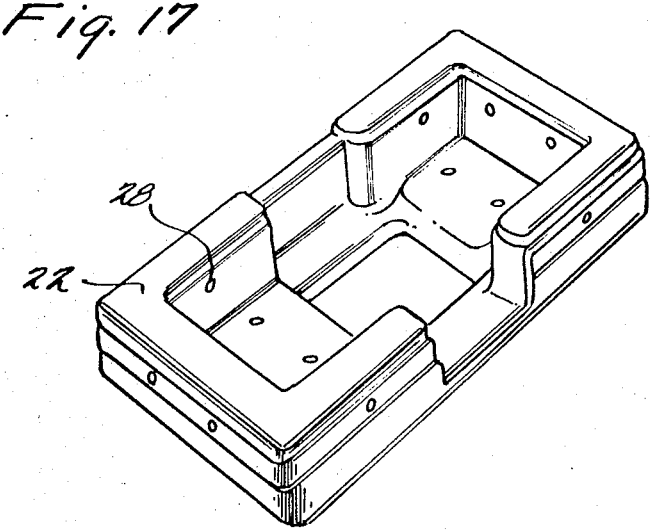
Figure 18:
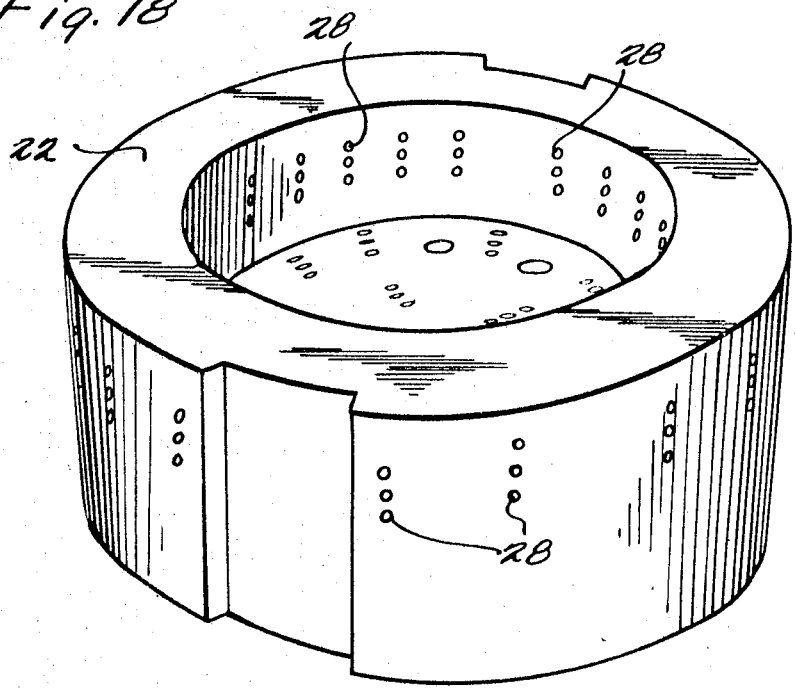

FIGURES 16a, b, c and d, are plan views in section of various shapes of tubes suitable for use with the instant invention;

FIGURE 17 is a perspective view of another embodiment of the isolator shock element of the instant invention; and FIGURE 18 is a perspective view of yet another embodiment of the shock isolator of the instant invention.

In the shipping and storage of articles, the articles are frequently subjected to G factors often in excess of 100 or greater; the G factor being an indication of the maximum acceleration a fragile body can withstand without damage. For example, if the G factor of a given article is 50, the article can safely be subjected to an acceleration 50 times that of gravity. Further, during an impact the acceleration to which an article is subjected generally varies and the peak acceleration ratio during the impact is termed $Gm$. The $Gm$ value is valuable in determining the "cushioning factor" which is defined as $$Gm \Big/ \frac{H}{T}$$

where H is the drop height and T is the cushion thickness. The relationship of the "cushioning factor" to the energy per unit volume impressed on the cushion, which can be expressed as $$\frac{W \times H}{A \times T}$$

where W is weight of article in pounds, and A is the area under compression, can be determined through the use of accelerometers directly from impact tests of cushioning materials without establishing the stress strain curve.

Materials having a low minimum $$Gm \Big/ \frac{H}{T}$$

value are advantageously employed as cushioning materials. Cellular cushioning materials having a high percentage of open cells, by allowing a portion of the enclosed air to escape can be thus compressed during impact to a small fraction of their thickness without building up high air pressures at the latter stages of compression.

Thus an open-cell material can absorb a given amount of impact energy per unit volume while exerting a lower peak pressure than is the case with a closed-cell material.

The instant invention, by providing elastomeric columns in the foam parallel with the direction of the compressive loading produces peak pressures or minimum cushioning factors comparable to that of the foam alone although at higher energy inputs.

Additionally, the static load bearing capacity of the cushioning devices of the instant invention under a transportation vibration of ±1 g is significantly greater than that of the foam alone.

Referring to the drawings, the shock isolator element of FIGURE 1 includes a backing sheet 10 of general L shape, composed preferably of corrugated fiberboard, the backing sheet 10 comprising a central section 12 and outer sections 14. The outer sections 14 are distinguished from the central section 12 by fold lines 16, constituting preferably die pressed folding scores, along each of which the connected outer section 14 is bent 90° with respect to the plane of the central section. By reason of the right angle trihedron relationship, the outer sections 14 abut each other along their common edge line 18, and staples 20 or other suitable fastening means are provided to maintain the sections in the relationship shown.

From each section of the backing sheet 10, a pad 22 or similar body of compressible cellular elastomeric material extends outwardly. The pads 22 are composed preferably of polyurethane foam resin foamed in contact with the backing sheet, whereby they are firmly adhered thereto, although other materials such as sponge rubber may be utilized as well, and they may be adhered to the backing sheet by gluing or other conventional means. These compressible cellular elastomeric materials are largely composed of tiny, air cells by reason of which they exhibit unique shock absorption properties.

The shock isolator element of FIGURE 1 is ready for incorporation into a cushioned container unit. FIGURE 2 illustrates an exemplary assembled container unit, wherein an inner article 24 is mounted within and completely spaced from an outer container 26. As will be understood, the inner article 24 may be a conventional container enclosing the fragile article to be protected. The outer container 26 may be a conventional corrugated fiberboard carton, corresponding in form to the inner article 24 and necessarily larger in size. In the illustrative unit, between each pair of corresponding corners of the outer container and inner article is interposed a shock isolator element of the type illustrated in FIGURE 1, the backing sheets thereof contacting the inner article and the outer container. For maximum protection, eight shock isolator elements may be employed in a single container unit, although a lesser number may suffice in some special applications. As will be evident, as few as two shock isolator elements, disposed in diametrically opposite corners of the container unit, may be employed.

The pads 22 of the shock isolator elements protect the inner article 24 from damage by vibration or shock. In the event the outer container 26 is dropped, for example, the shock transmitted to the inner article 24 is cushioned by a plurality of pads. When eight of the isolator elements are employed, for example, a drop on any side of the outer container is cushioned by as least four of the pads, and a drop on an edge or corner of the outer container is cushioned by a greater number, up to twelve, of the pads.

As previously indicated, the shock absorption capacity of compressible cellular elastomeric bodies is attributable to the multiplicity of air cells therein. The density and relative resilience of the pad material may be varied within wide limits to effect the desired range of shock absorption capacity, and the size of the pads may be determined in accordance with the weight of the inner article to be protected, the height of drop anticipated, and other variables such as the cushioning factor as defined above. The form of the pads is not critical, although it is desirable that they be of such form as to minimize the possibility of displacement or disarrangement in use. For example, the width of each pad (any edge dimension parallel to the backing sheet) should normally exceed its thickness (the dimension normal to the backing sheet), this relationship being effective under substantially all conditions of use to preclude disarrangement. If relatively thick pads are indicated by design considerations, displacement thereof in service may be prevented by adhering the pads to either the inner article or the outer container. This expedient is particularly useful when repeated use is contemplated. To avoid separate pieces which may become lost, for example, the pads, or the shock isolator elements, may advantageously be permanently adhered to the inner article 24.

As indicated hereinbefore, when protecting fragile articles of relatively heavy weight, the static load capacity of the pads may be a limiting factor. That is, the pads must exhibit not only the design shock absorption capacity, but should also be able to support the static load constantly applied thereto without substantial compression, and resist vibration forces such as those normally encountered in railroad transportation. To greatly increase the static load capacity of the pads and the resistance thereof to vibration forces, without materially decreasing the thickness efficiency thereof, an element exhibiting stiffness under initial compression may be embedded in each pad, and extend from opposite surfaces thereof in the direction of anticipated load. This element can be a solid rod of rubber or other elastomeric material, or conveniently may be in the form of a relatively stiff flexible tube 28 (see FIGURES 2 and 4). The tube element can be conventional rubber or neoprene tubing, which in short lengths and with lateral support of the elastomeric material functions effectively as a column resistant to buckling under static load, but adapted to buckle under shock forces applied in axial direction. The ratio of the cross-sectional area of compressible cellular elastomeric material to the tube element is at least 20:1. The upper ratio generally ranges about 100:1 although depending on the particular elastomeric material chosen as well as the compressible cellular material chosen the upper limit of the ratio can be as high as 200:1 or even greater. In a pad 4" x 4" x 2" thick, a rubber tube of ⅜" inner diameter and ⅛" wall thickness increases the static load capacity 100 to 200% without materially decreasing the thickness efficiency of the pad, or the durability thereof.

It is therefor a critical feature of the invention that the compressible cellular elastomeric material encase the tube element. Otherwise, if the compressible cellular elastomeric material were surrounded by the tube element, the ratio of tube wall thickness to diameter would be extremely small and the buckling resistance would be disadvantageously low.

An outstanding advantage of the shock isolator element of FIGURE 1 involves the ease and economy with which it may be shipped, stored and used. As illustrated in FIGURES 3 and 4, the element may be manufactured, shipped and stored in flat form, that is with the backing sheet planar. The elements in flat form are easily nested, and may be shipped and stored in minimum space. When required for use in container units, the outer sections of the individual elements may be folded along the fold lines 16 to the trihedral shape illustrated in FIGURE 1, and staples of other fastening means applied to maintain this configuration. An outer container of appropriate size which also may be shipped and stored in flat form, may then be set up in box form, and four shock isolator elements appropriately positioned in the bottom corner thereof. The inner article or container to be protected is then positioned in the bottom shock isolator elements, and four similar elements then positioned within the outer container, about the top of the inner article. Thereupon, upon closing the top of the outer container, the cushioned container unit is completed.

As will be recognized, the shock isolator elements may be supplied in standard sizes, each corresponding to predetermined load capacities. The load capacity of any shock isolator element is as previously indicated determined by the character and characteristics of the pad material, the dimensions of the pad, and the dimensions and character of the tube 28, if provided.

An outstanding feature of the shock isolator element described above is its suitability for mass production by a novel and economical method. Essentially, the shock isolator element of the instant invention can be produced by positioning at least one relatively stiff, flexible rod element in a mold, pouring a potentially foamable compressible cellular elastomeric material in said mold, whereby said reaction mixture foams in place to substantially surround said rod element, curing the resultant foamed compressible cellular elastomeric material, and removing said cured compressible cellular elastomeric material from the mold with said rod element encased therein, the cross-sectional area ratio of said compressible cellular elastomeric material to said rod element being at least about 20:1.

In one embodiment of producing the shock isolator element of the instant invention a backing sheet can be placed on the mold, prior to forming and curing the potentially foamable reaction mixture. The backing sheet is placed in a horizontal position over the top end of the rod element, whereby the reaction mixture foams in place in contact with the backing sheet while at the same time surrounding the rod element. As illustrative of a convenient manner to produce the novel shock isolator element reference is made to FIGURES 5-8.

FIGURE 5 illustrates a mold assembly, including a mold 30 comprising a bottom 32 and sides 34. The mold 30 is open at its top, and a plurality of pegs 36 extend upwardly from the bottom 32 thereof at evenly spaced intervals. A stripper plate 38 is adapted to rest on the mold bottom 32, being substantially coextensive in area therewith, and is provided with apertures 40 corresponding in location and size to the pegs 36, whereby the stripper plate is adapted to fit thereover.

As another part of the mold assembly, a fiberboard sheet 42 is employed. The sheet 42 is divided into sections by die pressed fold lines 16 and die cut slits 44, the slits being discontinuous whereby adjoining sections are joined thereacross by short interruptions 46 in the slits. As will be evident, the sheet 42 is adapted to be separated by means of the slits 44 into four backing sheets 10, each L shaped and corresponding to an individual shock isolator element.

In manufacturing the shock isolator elements in accordance with the present invention, a stripper plate 38 is initially positioned in a mold 30, the stripper plate passing over the pegs 36 and resting on the mold bottom 32. A short rubber tube 28 is then positioned over each peg 36, the tubes 28 being of appropriate length to extend to the top of the mold. A conventional potentially foamable compressible cellular elastomeric reaction mixture comprising, for example, an organic material containing free hydrogen groups and an organic isocyanate compound is then poured into the mold, preferably along the longitudinal center line thereof, and a sheet 42 is then placed over the top of the mold and maintained in position by an appropriately rigid frame (not shown). It is desirable, in most cases, to provide clearance of about 1/64 or 1/32 of an inch between the top of the mold and the sheet 42, to vent the air displayed by the expanding reaction mixture.

Among the organic materials having free reactive hydrogen groups which may be utilized are polyesters, polyesteramide, polyols such as alkylene glycols, polyisocyanate-modified alkylene glycols, polyoxyalkylene glycols, polyisocyanate-modified polyoxyalkylene glycols, castor oil, etc. Suitable organic isocyanates which can be utilized in the production of the shock isolator elements are 2,4 toluene-diisocyanate, 2,6 toluene-diisocyanate, mixtures of the two or other conventional isocyanate compounds.

As the reaction mixture foams, it rises in the mold and expands to the top, sides and corners thereof, engulfing the tubes 28. As shown in FIGURE 5 the sheet 42 is provided with a plurality of vent holes 48, positioned to permit free egress of air immediately in the wake of each tube, to permit the reaction mixture to seal itself together on the lee side of each tube, and to thereby preclude entrapment of air at these points with consequent formation of large bubbles in the cellular elastomeric material. It has been found satisfactory to provide two or three small vent holes, 3/32 or ⅛ inch in diameter, adjoining the position of each tube 28, and outwardly thereof, except in the case of the outside corner sections of the sheet. In the corners of the mold, as shown in FIGURE 5, the foaming reaction mixture flows generally toward the corners, and the vent holes are best positioned generally between the center of each corner section and the outer corner thereof, and accordingly in the wake of the flow of reaction mixture around the end tubes of the rows.

The foaming reaction mixture adheres strongly and permanently to the sheet 42, and it is desirable further that the mixture adhere as well to the tubes 28. The mixture adheres well to commercially available neoprene tubing. Much commercially available rubber tubing is coated with talc or a silicone compound which tends to prevent adherence of the polyurethane resin thereto, and if rubber tubing is employed, it should be washed to insure the removal of such coating. When the resultant polyurethane resin is firmly adhered to the rubber tubing, the resultant pad structure functions in optimum fashion, since the rubber tubing is closely bonded to and supported by the cellular elastomeric material about the entire outside periphery of the tubing. The tubes are laterally stabilized by the foam resin, especially when adhered thereto, so that they are initially stiff under endwise compression. Under impact, the rubber tubing deforms without transmitting unduly large forces, the greater part of the impact energy being absorbed by the polyurethane foam body.

The appropriate quantity of reaction mixture for use in the mold can be readily ascertained by trial, it being obviously desirable that the mold should be entirely filled, without large cavities therein, and that there should be minimum extrusion of excess resin through the clearance slots and vent holes provided. When the foaming is complete, the assembly is cured by heat in the mold. FIGURE 6 illustrates the cured assembly in the mold. Thereafter, the assembly is removed from the mold with the aid of stripper plate 38, and the stripper plate is separated, leaving a solid block of polyurethane foam resin, with the tubes 28 embedded and bonded therein and sheet 42 firmly adhered to one surface thereof. Separation of the resin body from the mold and stripper plate may be facilitated by coating these members, prior to contact with the reaction mixture, with any of the well known parting compounds and compositions, which resist adherence of polyurethane foam resin.

The resin block is then cut inwardly from the exposed surface thereof, in planes normal to the sheet 42 and at intervals between the tubes 28, substantially to but not through the sheet 42. Figures 7 and 8 illustrate the cuts 50, which separate the resin into individual pads 22, each including a tube 28 at the center thereof. As will appear, the cuts 50 may be effected efficiently by gang saws, and coincide with the fold lines 16 and slits 44 of the sheet 42. After sawing of the cuts 50, the assembly may be readily separated into three-pad clusters, merely by pulling the slits 44 apart breaking the interruptions 46 therein. Each three-pad cluster, it will be evident, is backed with corrugated fiberboard and consitutes a shock isolator element in flat form, as illustrated in FIGURES 3 and 4.

While in FIGURES 5-8, the method is illustrated by simultaneous manufacture of four shock isolator elements, in commercial practice the mold may be much larger and designed for a larger number of elements.

Referring now to FIGURES 9 and 10, there is disclosed a preferred embodiment of the instant invention wherein the elastomeric columns 28 comprise a triple tube more clearly shown in FIGURE 11. The center to center dimension of adjacent tubes is 0.625 inch, the inner and outer diameters of the tube being 0.375 inch and 0.625 inch respectively. The triple tube is approximately 2 inches long and the tubes are spacedly connected to each other by a thin webbing 52 about 0.015 inch thick extending longitudinally the length of the tubes. The tubes are spaced about 0.015 inch apart; the circular polyurethane foam pad 22 being about 2 inches high and having a dameter of about 4⅞ inches. The cross-sectional area of the triple tube elastomeric column is approximately 0.589 in.$^2$ while the cross-sectional area of the polyurethane foam is approximately 17.6 in.$^2$. Thus, the ratio of foam cross-sectional area is about 30:1. The radius of gyration of the triple tube is 0.183 inch. A double tube and single tube having the same length and inside and outside diameters as the triple tube were also produced and employed with a polyurethane foam pad of approximately the same dimensions of the pad shown in FIGURE 9. The radius of gyration of these tubes or columns is essentially the same as that shown for the triple tube of FIGURE 11. The following table compares the static and optimum dynamic load capacity of these cushioning devices with a polyurethane pad of essentially the same dimensions but without an elastomeric column.

TABLE

| Elastomeric column (No.) | Static load capacity (lbs.) | Optimum dynamic load capacity (lbs.) |
|---|---|---|
| None | 11.0 | 6 |
| Single tube | 12.5 | 11 |
| Double tube | 25 | 16 |
| Triple tube | 37.5 | 19 |

The static load capacity of the columns or tubes were measured under a transportation vibration of approximately 1 g. The foam material varied in thickness from 2 to 3 inches.

The optimum dynamic load capacities reported in the table above are taken from FIGURE 12 which graphically illustrates the relationship of the peak acceleration attained on impact of an article with the optimum dynamic load capacity of the various cushioning devices described above.

Preferably, in the production of the foam pad when it is circular in cross section the diameter to thickness ratio of the polyurethane foam pad is greater than 3:1. This ratio provides developing substantially the full potential of the column or tube encased therein.

In FIGURE 12, curve A illustrates the dynamic load capacity of a polyurethane foam pad having a diameter of about 4¹³⁄₁₆ inches, a foam density of 4 lbs./ft.$^3$ and a thickness of about 2 inches. The physical dimensions of the pads employed in determining curve B where the pad had a single elastomeric column, curve C where the pad had a double elastomeric column and curve D where the pad had a triple elastomeric column are essentially the same. The drop height of 30 inches used in developing these curves is equal to a velocity of 150 inches/sec.

Preferably the elastomeric columns used in the cushioning devices of the instant invention are, for economic reasons extruded rubber shapes having a constant cross section. Generally shapes are employed which do not significantly distort while being cured after extrusion and it will be appreciated that a variety of shapes can be employed as illustrated in FIGURES 16a, b, c and d. Preferably, also, the columns are made of GR-S rubber exhibiting 40 to 80, preferably 60-80, Shore A Durometer.

Figure 13:
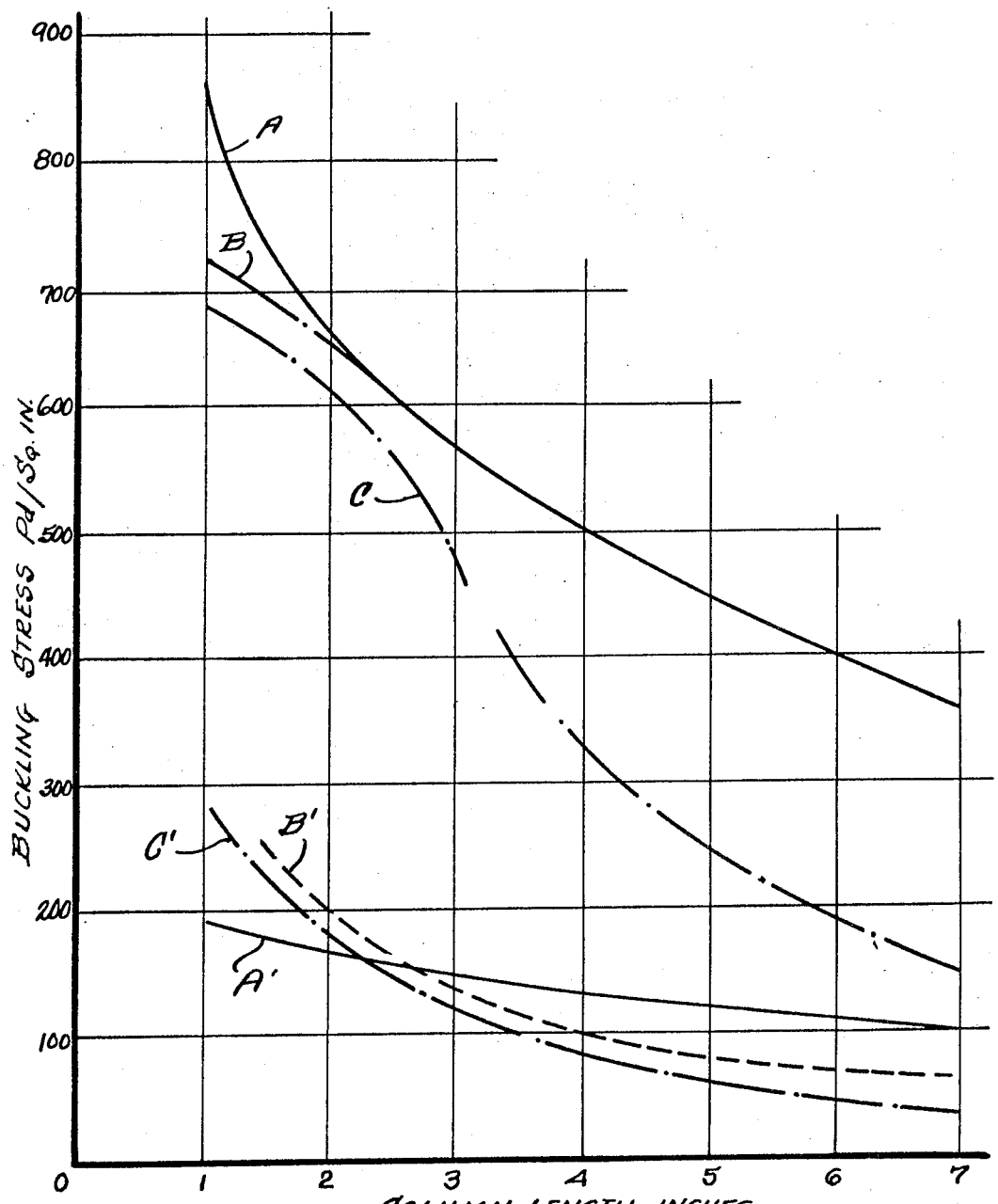
FIGURE 13 is a graph illustrating dynamic and static tests of cushioning devices of the instant invention and depicting the relationship of the buckling stress with the length of the tube employed.

FIGURE 13 illustrates dynamic and static tests employing three embodiments of the instant invention. Curves A and A' represent the dynamic and static tests employing a cushioning device comprising a pad of polyurethane foam having a density of 2.75 lbs./cu. ft., a thickness varying from 1 to 7 inches and a diameter varying from 4 to 7 inches. The foam cross-sectional area varies according to the diameter of a given particular pad. The elastomeric column embedded in the polyurethane foam has a cross section substantially that shown in FIGURE 16a. This triangular shaped tube has a cross-sectional area of 0.39 in.$^2$, a radius of gyration of 0.284 inch, varies in column length from 1-7 inches and is fabricated from 80 Durometer GR-S rubber.

The curves B and B' represent the dynamic and static tests employing another cushioning device fabricated in accordance with the novel concepts of this invention. The polyurethane foam pad has, substantially the same physical dimensions outlined above. The elastomeric column embedded in this foam pad is a triple tube illustrated in FIGURES 9 and 10 having a cross-sectional area of 0.589 in.$^2$ and a radius of gyration of 0.183 inch. This triple tube column was also extruded from 80 Durometer GR-S rubber.

Curves C and C' illustrate the dynamic and static tests, respectively, employing, again, a foam material as described above having embedded therein a triple tube elastomeric column whose dimensions are those disclosed with reference to curves B and B'. However, the tubes employed in the cushioning devices to secure curves C and C' are extruded from 60 Durometer GR–S rubber.

In obtaining the data for the dynamic tests, represented by curves A, B and C, a drop height of 30 inches, comparable to a velocity of 150 inches/sec. was employed. The static tests, represented by curves A', B' and C' were performed in a compression testing machine at a speed of approximately 0.85 inch/min.

From this graph it can be seen that under dynamic conditions, a cushioning device provided with a triangular shaped elastomeric column develops a greater buckling stress under impact than the triple tube column. The static buckling stress of the triangular tube is superior at lengths greater than 2.5 inches than the triple tubes. However, for cushioning devices up to 2.5 inches in thickness the triple tube columns are preferred because of their advantageous static load bearing capacities as well as their ease of manufacture.

Figure 14:
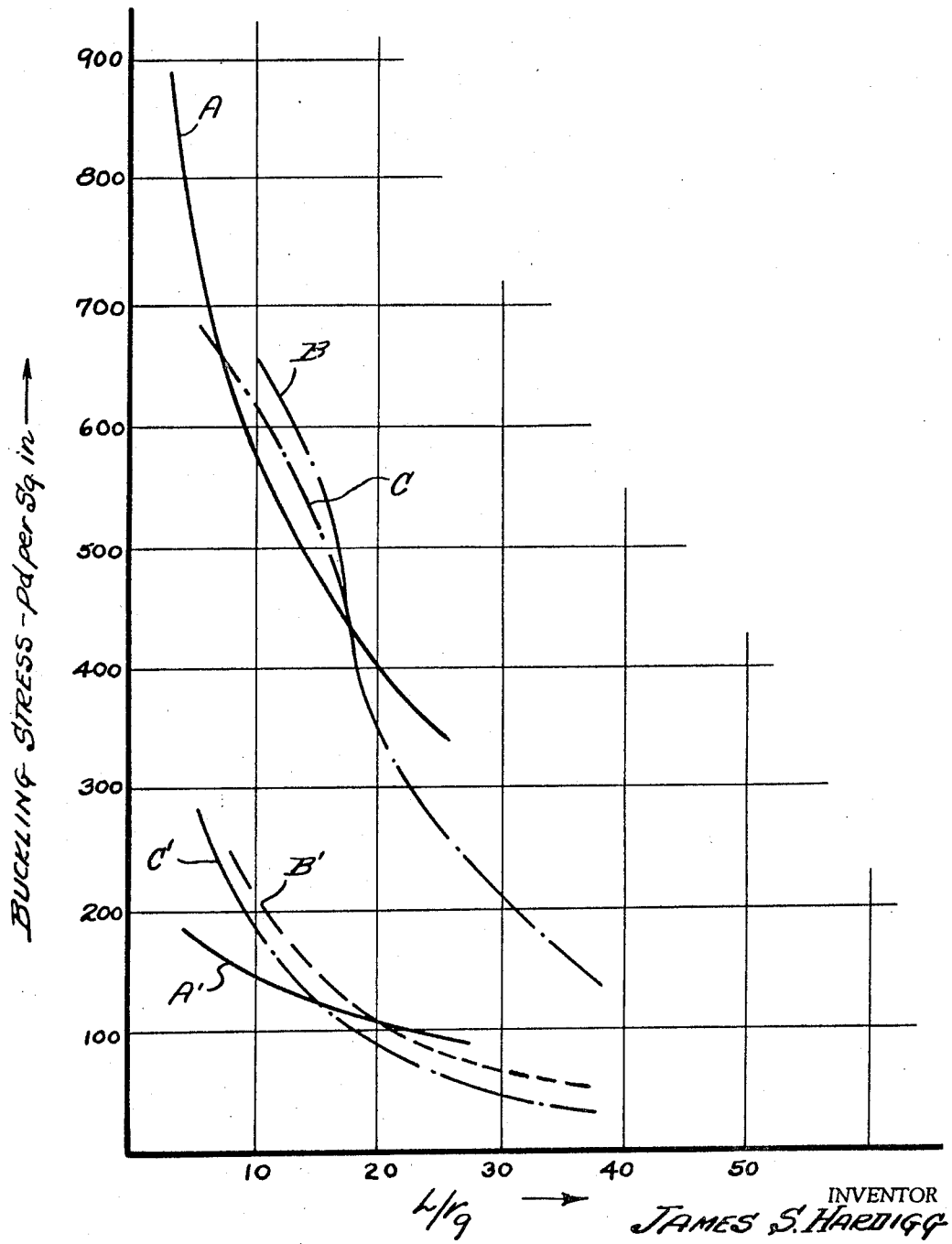
FIGURE 14 is a graph illustrating dynamic and static tests of cushioning devices of the instant invention and depicting the relationship of the buckling stress with the ratio of $L/r_g$ where L is the length of the tube and $r_g$ is its radius of gyration.

FIGURE 14 illustrates dynamic and static tests employing essentially the same cushioning devices as those associated with the tests in obtaining the data illustrated in FIGURE 13. The test data represented by FIGURE 12, however, illustrate the relationship of the buckling stress to the ratio of the length of the column to its radius of gyration. This graphical representation can be used to determine the buckling stresses of other columns fabricated from similar materials according to the relationship defined by Eulers' column formula for the buckling stress of a "long" column:

$$\frac{\sigma B}{E} = \frac{K(r_g)^2}{(L)^2}$$

where $\sigma B$ = buckling stress (lbs./in.$^2$)
$E$ = modulus of elasticity (lbs./in.$^2$)
$r_g$ = radius of gyration of cross section (inches)
$L$ = length of column (inches)
$K$ = constant In comparing the advantages of the instant invention over a strip sheet of rubber, the equivalent amount of rubber employed to produce the triple tube column illustrated in FIGURE 11 is fabricated into a strip column 0.125 inch thick and 4.7 inches long. The minimum radius of gyration would, according to the equation $$r = \frac{h}{\sqrt{12}}$$

where $h$ (height) = 3 inches, be 0.036 inch. The ratio of $L/r_g = 3/0.036 = 83$. Employing Euler's column formula to extrapolate the 80 Durometer triple tube static buckling stress data of FIGURE 14 from $L/r_g = 40$ to $L/r_g = 83$ it can be seen that the following buckling stress is developed:

$$\sigma B = 60 \times \frac{40^2}{83^2} = 14 \text{ lb./in.}^2$$

As can be seen this is extremely low compared with the static buckling stress of approximately 135 lbs./in.$^2$ provided by the 80 Durometer triple tube at a 3 inch column height shown in FIGURE 13.

Figure 15:
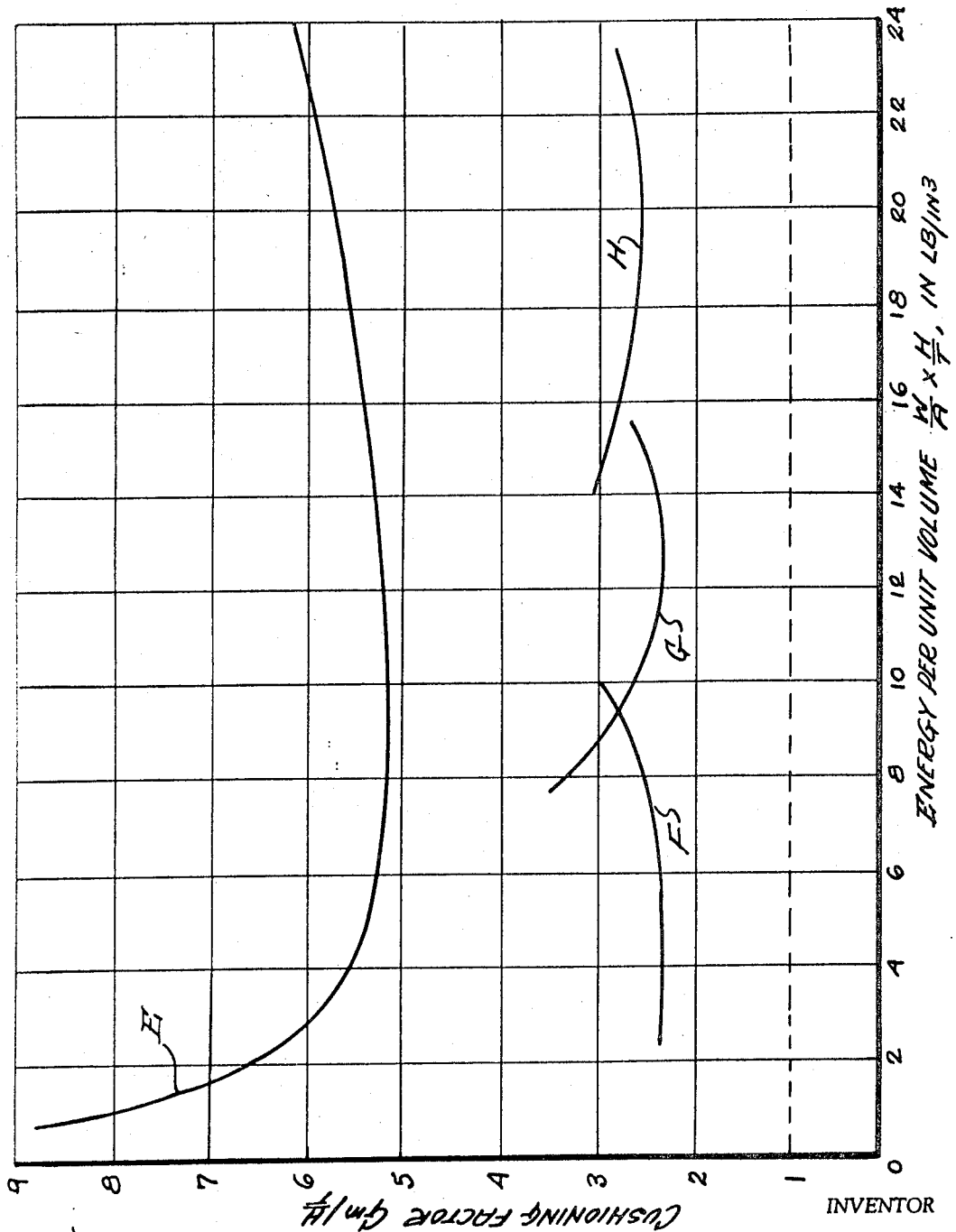
FIGURE 15 is a graph depicting the relationship of the cushioning factor to the impact energy per unit volume for various compression cushioning materials made according to the instant invention.

FIGURE 15 illustrates the relationship of the cushioning factor with the impact energy per unit volume for various compression cushioning devices. The data in this graph illustrate the criticality of providing an open cell type cushion device in which the foam material surrounds the elastomeric column or tube. The cellular cushioning devices of this invention have a high percentage of open cells as measured by the ratio of the cross-sectional area of the foam to the cross-sectional area of the elastomeric column and thus allow a signficant portion of the enclosed air to escape. They can, accordingly, be compressed during impact to a small fraction of their thickness without building up high air pressures at the latter stages of compression as in the case of closed-cell materials or those which have a low ratio of foam cross-sectional area to elastomeric column cross-sectional area.

Desirable low cushioning factors at large energy inputs have been attained with the cushioning devices of the instant invention. Data obtained using cushioning devices made according to the instant invention are shown in FIGURE 15 and it can be seen from this graph that a cushioning device using 4 lbs./cu. ft. polyurethane foam surrounding a triple tube column, the device being 2 inches thick and 4 inches wide exhibited a minimum cushioning factor of approximately 2.5 at energy inputs of about 20 in.-lb./in.$^3$. Other embodiments of the instant invention exhibit minimum cushioning factors of approximately 2.5 at energy inputs between 12 and 20 in.-lb./in.$^3$.

The significance of providing the elastomeric column surrounded by air can be appreciated from the curve E of FIGURE 15. In a situation where the air cannot escape the cushioning effect is analogous to the compressive stress-strain curve for air compressed in a cylinder without leakage or heat loss. Such a cushioning performance is shown by curve E and the minimum cushioning value is 5.1 at an energy input of 9.4 in.-lb./in.$^3$.

The improvement of providing polyurethane foam pads with an elastomeric column embedded therein is demonstrated by a comparison of the cushioning factor exhibited by a foam pad without a column to those with a column. Curve F of FIGURE 15 illustrates the "cushioning factor" of a two-inch thick flexible polyurethane foam pad having a density of 4 lbs./ft.$^3$. As can be seen, the cushioning factor is low although only at low energy inputs. On the other hand, isolator shock absorber elements made according to the instant invention and represented by curves G and H provide relatively low cushioning factors at substantially large energy inputs. The element represented by curve G was a polyurethane foam pad 3 inches thick, 4 inches wide, having a density of 4 lbs./ft.$^3$ and having embedded therein a double tube elastomeric column as described hereinbefore. The shock absorber element represented by curve H was a polyurethane foam pad 2 inches thick, 4 inches wide, having a density of 4 lbs./ft.$^3$ and having embedded therein a triple tube elastomeric column as described hereinbefore.

Further, where the foam has a significant portion of closed-cells the device exhibits disadvantageously, relatively high rebound velocities because a large portion of the impact energy is stored in the trapped air which re-expands. On the other hand, due to the specific structure of the devices of the instant invention, these open-cell structures show relatively little rebound. Only the portion of the air which remains in the cushion is available to expand and contribute to the rebound of the load.

Figure 16B:
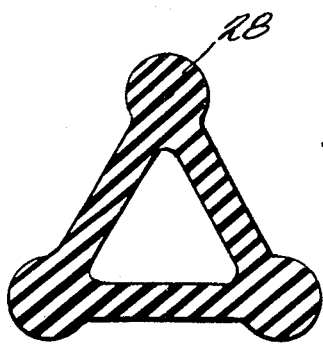
Figure 16C:
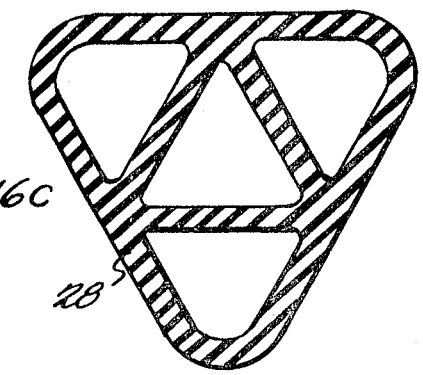
Figure 16D:
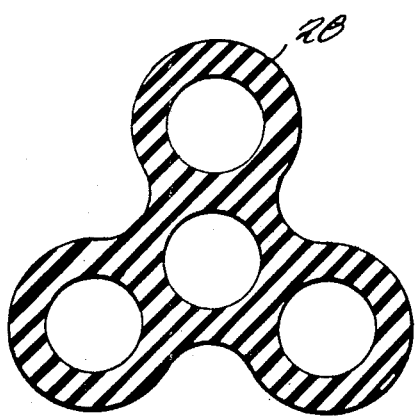

FIGURES 16a, b, c and d show in cross-section various elastomeric tubes which can be advantageously employed in the cushioning devices of the instant invention. The cross-sectional area of the tube shown, for instance, in FIGURE 16a which is substantially triangular in shape, is 0.39 in.$^2$ and has a radius of gyration of 0.284 in. The tubes shown in FIGURES 16b, c and d are quite effective although because of their complicated structure their use would increase the cost of producing the cushioning devices.

FIGURES 17 and 18 show other specific forms of the cushioning device of the instant invention. Thus forms other than the trihedron pads of FIGURE 1 can be employed. FIGURE 17 shows a five-sided molded flexible polyurethane cushion suitable for use in each half of a center-split aluminum transit case. FIGURE 18 shows a molded flexible polyurethane foam cushion useful in cylindrical steel containers for cushioning devices weighing as high as 475 lbs. or greater.

What is claimed is:

1. A method of making a shock isolator element comprising the steps of positioning at least one flexible rod element in a mold so that said rod element extends from the bottom of said mold substantially to the top of said mold, pouring a potentially foamable compressible cellular elastomeric material in said mold, placing a backing sheet on said mold in horizontal position over the top end of said rod element, whereby said reaction mixture foams in place in contact with said backing sheet and surrounding said rod element, curing the resultant foamed compressible cellular elastomeric material, removing said cured compressible cellular elastomeric material from the mold with said backing sheet and said rod element encased therein, the cross-sectional area ratio of said compressible cellular elastomeric material to said rod element being at least about 20:1.

2. A method of making a shock isolator element comprising the steps of positioning at least two rows of short lengths of flexible rod elements in a mold in evenly spaced relationship, each of said rod elements extending from the bottom of said mold substantially to the top of said mold, pouring a potentially foamable compressible cellular elastomeric reaction mixture between said rows of rod elements, placing a backing sheet divided into separable portions by lines of weakness on said mold in a horizontal position over the top ends of said rod elements, whereby said reaction mixture foams in place in contact with said backing sheet and surrounding said rod elements, curing the resultant foamed compressible cellular elastomeric material, removing said cured compressible cellular elastomeric material from the mold with said backing sheet and said rod elements encased therein and separating the backing sheet into portions each having a cluster of three individual compressible cellular elastomeric bodies angularly arranged, the cross-sectional area ratio of each of said compressible cellular elastomeric bodies to said rod elements being at least about 20:1.

3. The method of claim 1 wherein the potentially foamable compressible cellular elastomeric reaction mixture comprises an isocyanate-polyol reaction mixture.

4. The method of claim 1 wherein said rod element is a tube.

5. The method of claim 1 wherein three rod elements are embedded in said compressible cellular elastomeric material.

6. The method of claim 4, wherein the tube is substantially triangular in cross section.

References Cited
UNITED STATES PATENTS

| | | | |
|---|---|---|---|
| 2,806,812 | 9/1957 | Merz | 264—45 XR |
| 2,979,246 | 4/1961 | Liebeskind. | |
| 3,166,227 | 1/1965 | Ragnow | 264—45 XR |
| 3,301,926 | 1/1967 | Reiland | 264—45 |
| 3,383,440 | 5/1968 | Chaldekas | 264—45 |

FOREIGN PATENTS

| | | |
|---|---|---|
| 720,956 | 12/1954 | Great Britain. |
| 914,970 | 10/1946 | France. |

PHILIP E. ANDERSON, *Primary Examiner.*

U.S. Cl. X.R.

264—54, 263, 271